United States Patent [19]

Krishnamoorthy et al.

[11] Patent Number: 5,790,753

[45] Date of Patent: Aug. 4, 1998

[54] SYSTEM FOR DOWNLOADING COMPUTER SOFTWARE PROGRAMS

[75] Inventors: Suban Krishnamoorthy, Shrewsbury; Ronald A. Faccenda, Southborough, both of Mass.

[73] Assignee: Digital Equipment Corporation, Maynard, Mass.

[21] Appl. No.: 589,294

[22] Filed: Jan. 22, 1996

[51] Int. Cl.$^6$ .................................................. G06F 15/16
[52] U.S. Cl. .................. 395/200.33; 395/200.3; 370/464; 348/7; 348/461; 455/6.2
[58] Field of Search .............. 364/514 R, 514 A, 364/514 C; 371/32; 370/464, 474; 348/7, 12, 13, 461, 466, 467; 455/5.1–6.3, 49.1, 50.1, 59, 63, 103; 395/200.3, 200.33

[56] References Cited

U.S. PATENT DOCUMENTS

| | | | |
|---|---|---|---|
| 4,965,825 | 10/1990 | Harvey et al. | 384/49 |
| 5,481,542 | 1/1996 | Logston et al. | 348/7 |
| 5,630,757 | 5/1997 | Gagin et al. | 348/13 |
| 5,635,979 | 6/1997 | Kostreski et al. | 364/976.3 |
| 5,640,453 | 6/1997 | Schuchman et al. | 348/7 |

OTHER PUBLICATIONS

"Final Text for ISO/IEC DIS 13818–1: Information Technology –Generic Coding of Moving Pictures and Associated Audio Information: Systems Attachment: Explanatory Report [JTC 1/SC 29/WG 11 N 721]" (Information Processing Society of Japan/Information Technology Standards Commission of Japan [A Standards Organization accredited by JISC]), Date: 1994–06–13.

Primary Examiner—James P. Trammell
Assistant Examiner—Craig Steven Miller
Attorney, Agent, or Firm—Dirk Brinkman

[57] ABSTRACT

In a video-on-demand system, a disk-less set-top box is configured to download software programs from a video server via a network. The set-top box includes a read-only memory storing a boot program, a control protocol stack, and a video protocol stack. The control protocol stack is connected to a bidirectional control channel of a circuit of the network, and the video protocol stack is connected to a unidirectional video channel of the circuit. Using a handheld remote controller, a consumer makes a request for a software program from the video server. The request is made via the control protocol stack and the control channel. The video server transmits the software program as an encoded video transport stream, which is received via the video channel and the video protocol stack. The transport stream is decoded to reconstruct the requested program in a dynamic random access memory of the set-up box from where the program can be executed in a processor of the set-top box.

20 Claims, 12 Drawing Sheets

| ADAPT. FIELD LENGTH | DISC INDICATOR | RANDOM ACCESS INDICATOR | ELEM. STREAM PRIORITY INDICATOR | PCR FLAG | OPER FLAG | SPLICING POINT FLAG | TRANS. PRIV. DATA FLAG | ADAPT. FIELD EXT FLAG | OPT. FLD | PAD BYTE |
|---|---|---|---|---|---|---|---|---|---|---|
| 241 | 242 | 243 | 244 | 245 | 246 | 247 | 248 | 249 | 250 | 229 |

| TABLE ID | SEC. STX IND. | PRIV. IND. | R | PRIV. SEC. LGTH | TABLE ID EXT. | R | VER. NMB. | CRT NXT IND | SEC. NMB. | LST SEC. NMB. | N PROGRAM BYTES | CRC |
|---|---|---|---|---|---|---|---|---|---|---|---|---|
| 1001 | 1002 | 1003 | 1004 | 1005 | 1006 | 1007 | 1008 | 1009 | 1010 | 1011 | 1012 | 1013 |

FIG. 10

SYSTEM FOR DOWNLOADING COMPUTER SOFTWARE PROGRAMS

FIELD OF THE INVENTION

This invention relates generally to downloading computer software programs, and more particularly to downloading programs using video circuits of a wide area network.

BACKGROUND OF THE INVENTION

In distributed computer systems, client computers are connected to server computers by a network. The network can either be a local area network (LAN), or a wide area network (WAN). During operation of the distributed computer systems, the server computers perform processing functions at the request of the client computers. Requests for services, and replies that are responsive to the requests, are communicated via circuits of the network.

Typically, the client computers include a digital processor, one or more input/output (I/O) interfaces, and, depending on the application environment, specialized digital or analog sub-systems, all connected by signaling buses. In addition, the client computers also include memories for storing data and instructions to operate the processor, interfaces and sub-systems.

The instructions comprise operating system (O/S) programs, and application programs, e.g. "software." The software can include data sections in the form of bit-maps. During operation of the client computers, the computer executable software display the bit-maps as selection menus, and users interact with the executing software and menus to direct the processing activities of the client and server computers.

In most client computers, volatile dynamic random access memory (DRAM) is used to store the software programs immediately used by the processor. Persistent memory, such as a disk storage device, is used for long term storage of the programs and their data.

In order to decrease the cost and complexity of the distributed system, it may be advantageous to configure the client computers without any disk storage as "disk-less" computers. In disk-less computers, the software is typically provided to the client computers by the server computers over the network in a process known as downloading. It is a problem to download software programs in a timely and error-free manner.

Disk-less computers are well-known in prior art LAN-based distributed computer systems. Typically, a LAN uses symmetric full-duplex circuits, such as Ethernet. In such an environment, trivial file transfer protocols (TFTP) can be used to reliably down-load programs from the servers to the clients over the high-speed communications circuits of the LAN.

Using TFTP, a client computer makes a down-load request for a block of data, for example, a portion of machine executable software. The initial "boot" program executed by the client can be stored in a non-volatile read-only memory (ROM). The down-load request is made to the server via the LAN network. The server, in response to the request, replies the block.

When the block is received, the client computer determines if the block was received without errors. If this is true, the client can request a next block. Otherwise, the block is requested again. Correctly received blocks can be reassembled and stored in the volatile memory of the disk-less system for immediate execution. In LAN-based distributed computer systems, the reliability and bandwidth of the transport circuits used to down-load software are adequate to fulfill the needs of most users.

More recently, WAN networks have been used to interconnect distributed computer systems. One example of a WAN-based distributed computers system is a video-on-demand (VOD) system. Here, servers centrally store movies, games, files, e.g., video programs, in short "videos." Client computers remotely located at customer premises, in response to user demands, make requests for the videos.

In order to make the client computers affordable and reliable for a mass market, they are typically in the form of disk-less set-top boxes (STB). However, here the number of applications that need to be executed by the STB can be large and varied. It is a problem to down-load software using circuits of a WAN.

In a WAN, circuits used for transporting videos typically include low-speed full-duplex channels for control signals, and high-speed simplex channels for video signals. Using the control channels for downloading software programs may take minutes, and the video channels may be unreliable for transporting programs.

Therefore, there is a need for a reliable method and apparatus for download software programs used by client computers in a WAN-based video-on-demand system. In addition, the downloading should be completed in a reasonable amount of time.

SUMMARY OF THE INVENTION

In a video-on-demand system, a disk-less set-top box is used to download software programs from a server computer using a communications network having circuits configured for transporting video signals of video programs. The server computer encodes a requested software program into a video transport stream. The video transport stream is transmitted from the server computer to the set-top box as a continuous video transport stream over a circuit of the network. In the set-top box, the continuous video transport stream is decoded to reconstruct the software program in a volatile memory of the set-top box.

In one aspect of the invention, the circuit of the network includes a bi-directional control channel, and a unidirectional video channel. A request for the software program is sent from the set-top box to the server computer using the bi-directional control channel. The continuous video transport stream from the server computer is received into the memory of the set-top box via the unidirectional-directional video channel.

In another aspect of the invention, the video transport stream includes a plurality of transport packets. Each transport packet includes a header and payload. The software program is partitioned into a plurality of blocks, and the blocks are formatted as the payload of the transport packets. The formatting can be in accordance with a private data section of an industry standard MPEG transport packet, or as an off-set packet where each off-set packet includes an off-set field to indicate a relative position of a current block with respect to the beginning of the software program being transmitted.

In yet another aspect of the invention, the set-top box, while receiving the transport packets, determines if the packets were received correctly or incorrectly. If a packet is not received correctly, an identity of the packet is entered in a bad-block list. Then, after receiving all of the packets, the server can resend those packets identified in the bad-block list until the entire software program is correctly reconstructed. Alternatively, the server can resend the incorrectly received packets using the bidirectional control channel, while continuing to transmit the video transport stream on the unidirectional-directional video channel.

BRIEF DESCRIPTION OF THE DRAWINGS

FIGS. 2–6 are block diagrams of a portion of a bit stream representing an encoded video program according to a preferred embodiment of the invention;

FIG. 10 is a block diagram of a MPEG based encapsulation;

DETAILED DESCRIPTION OF A PREFERRED EMBODIMENT

Figure 1:
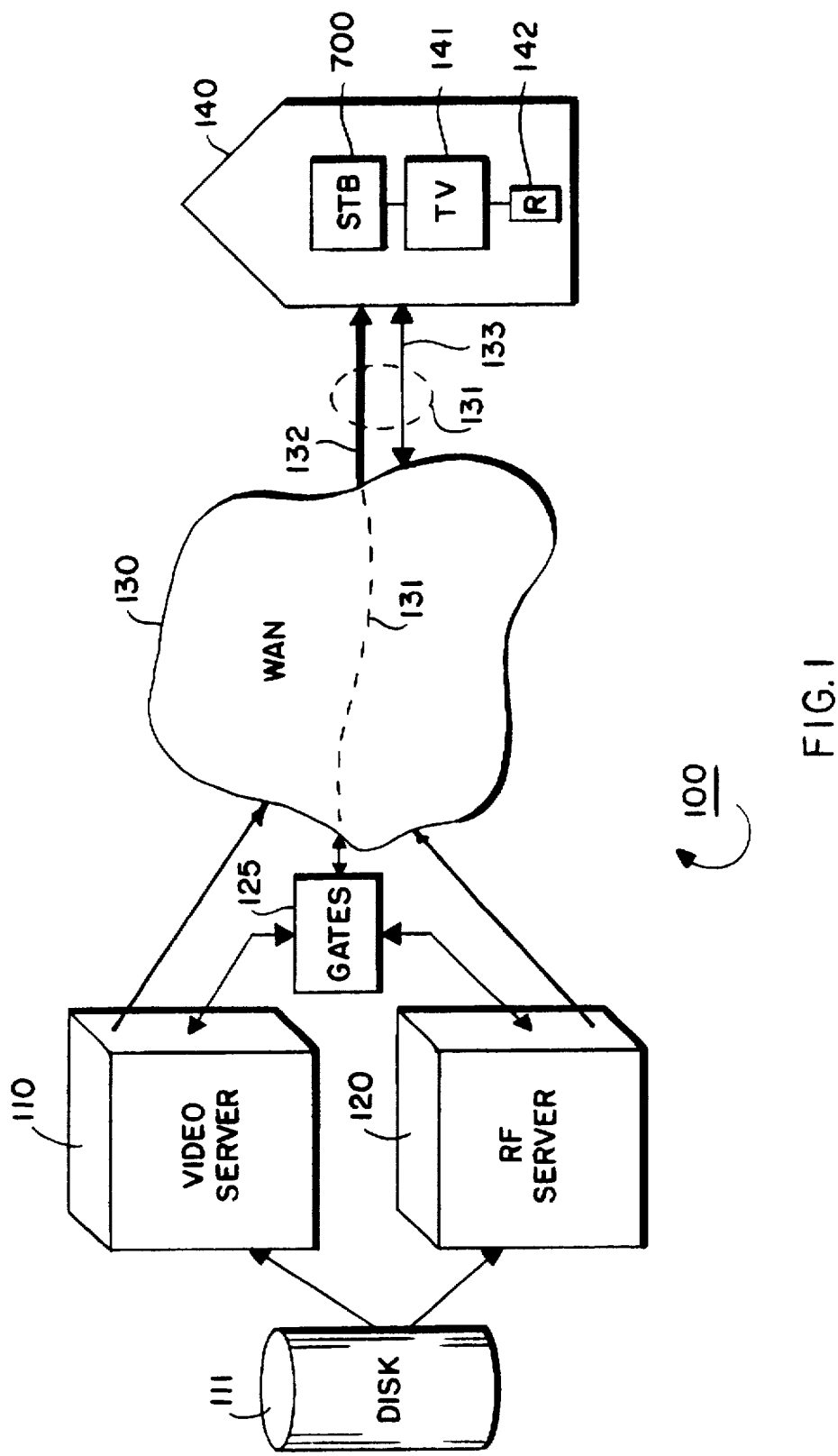
FIG. 1 is a block diagram of a video-on-demand system according to the invention.

FIG. 1 shows a video-on-demand (VOD) system 100 according to the invention. The system 100 includes a video server 110, a remote file server 120, a wide area network (WAN) 130, and a customer premises 140. The servers 110 and 120 are connected to a disk storage sub-system 111 for storing movies, games, and other files, e.g., "videos." The videos may be requested on-demand by users of the system 100. The network 130 includes a plurality of circuits 131, physical or virtual. The network 130 connection to the servers 110 and 120 is controlled by public access gateways (gates) 125. The gateways 125 include a public access Level 1 gateway, and a Level 2 gateway for accessing the servers 110 and 120.

The customer premises 140 includes a client computer, in the form of a disk-less set-top box (STB) 700, a display device, e.g., a television (TV) 141, and a remote controller (R) 142. Because the STB 700 is disk-less, the servers 110 and 120 also maintain software programs to operate the STB 700. The software can be stored on the disk sub-system 111. It is an object of the invention to download the software programs to the STB 700 in a timely and reliable manner.

During operation of the system 100, delivery of videos is initiated at the customer premises 140. A user makes a request using, for example, the remote control device 142, and the set-top box 700 executing boot software. In response to the request, a video circuit 131 is established between the servers 110 and 120 and the STB 700. The circuit 131 can have physical and virtual characteristics. Typically, the circuit 131 includes a high-speed unidirectional video channel 132, and a low-speed bidirectional control channel 133.

Once the circuit 131 has been established, the video is transported to the STB 700 as a continuous transport stream of data over the video channel 132. In the STB 700, the digital transport stream is decoded, and converted to analog signals for the TV 141. The consumer manipulates the videos using VCR-like commands such as PLAY, PAUSE, RESUME, FORWARD, BACKWARD, STOP and in addition, JUMP. The JUMP request allows the user to position the transport stream at any given off-set with respect to the beginning of the video program. The commands are transported over the control channel 133 of the circuit 131.

In one aspect of the invention, the transport stream and the VCR commands are used to reliably download software programs into the STB 700 using the video and control channels, and transport protocols designed to deliver video programs over a wide area network.

Typically, the videos are transported as a continuous transport stream according to some industry standard, for example, the Moving Pictures Experts Group (MPEG) standard, see "Coding of Audio, Picture, Multimedia and Hypennedia Information," ISO/IEC JTC 1/SC 29/WG, McInnes, Editor, 1994. The transport stream can have a constant or variable bit rate.

Figure 2:
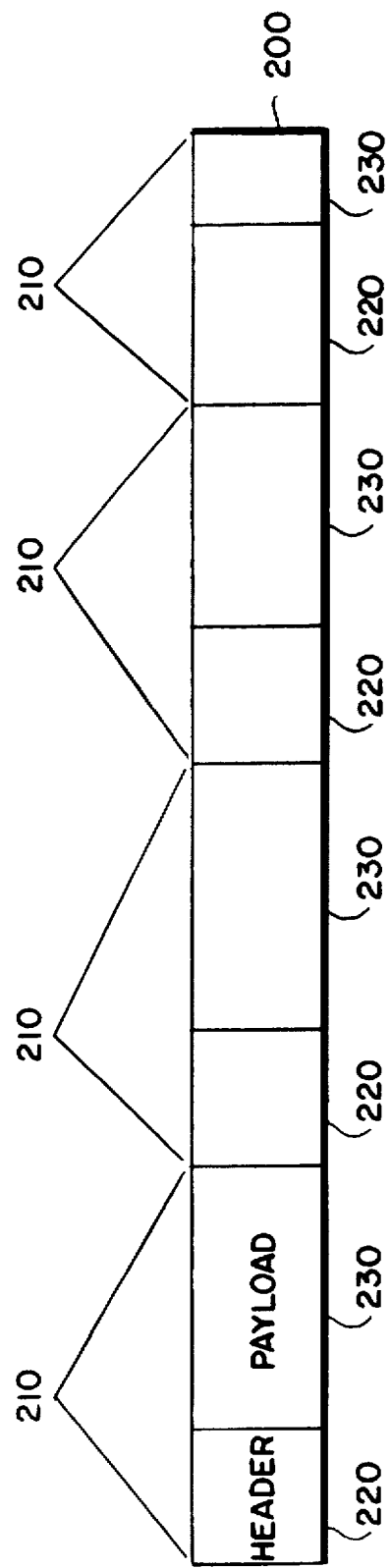

FIG. 2 shows an MPEG transport stream 200 including a plurality of transport stream (TS) packets 210. Each packet 210 includes, for example, 188 octets (bytes) of bits. Each packet 210 includes a 4 byte header 220, and a 184 payload 230. Each header 220 includes information necessary to decode the bits of the payloads 230.

The payloads 230 include the elementary encoded components of the videos, for example, audio, video, and data signals. The payload can be timed video program signals, or un-timed private data signals. For timed signals, the "playing" of the signals on the TV 141 is synchronized to real-time video program clock reference signals. Thus, the movie can be viewed at the right speed. Untimed payload can be any type of data. The invention exploits the transport stream for the delivery of software programs.

Figure 3:
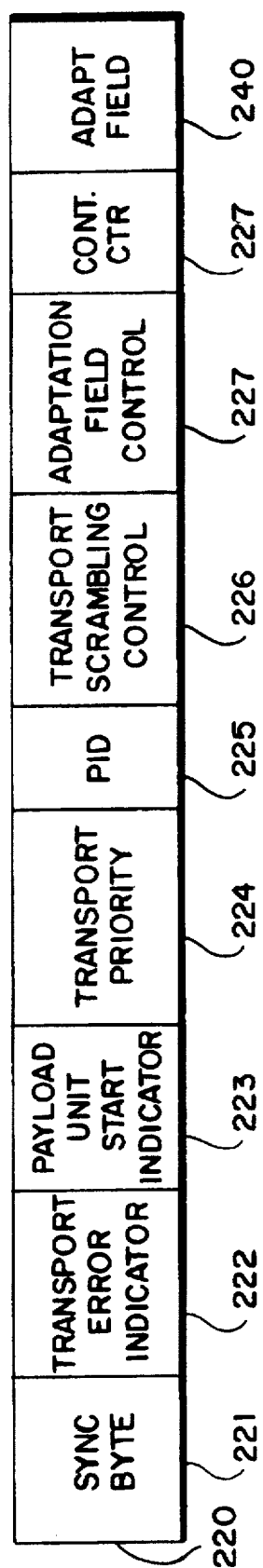

FIG. 3 shows the bit fields of the header 220 in greater detail. The fields include a sync byte 221, a transport error indicator 222, a payload unit start indicator 223, and a transport priority indicator 224. A packet identification (PID) 225 is thirteen bits. Following the PID 225 are a transport scrambling control 226, an adaptation field control 227, a continuity counter 227, and an adaptation field 240.

The adaptation field 240 is shown in greater detail in FIG. 4. The adaptation field 240 includes an adaptation field length 241, a discontinuity indicator 242, a random access indicator 243, an elementary stream priority indicator 244, a video program clock reference (PCR) flag 245, an optional PCR (OPCR) flag 246, a splicing point flag 247, a transport private data flag 248, an adaptation field extension flag 249, optional fields 250, and pad bytes 229.

Figure 5:
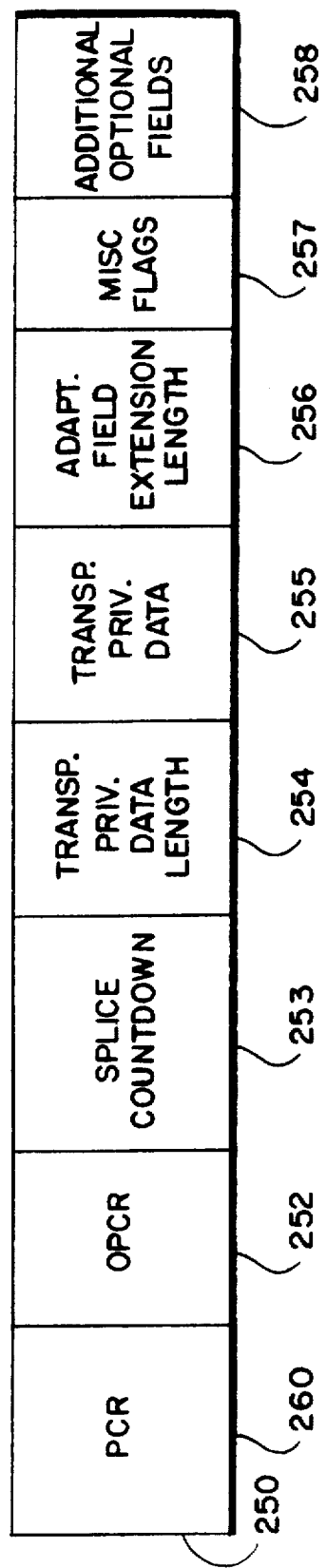

The optional fields 250 are shown in greater detail in FIG. 5. These bit fields, if the appropriate flag bits are set to "1" include a PCR 260, an OPCR 252, a splice countdown 253, a transport private data length 254, a transport private data 255, an adaptation field extension length 256, miscellaneous flags 257, and additional optional fields 258, which may be present when the appropriate miscellaneous flags are set to "1."

Figure 6:
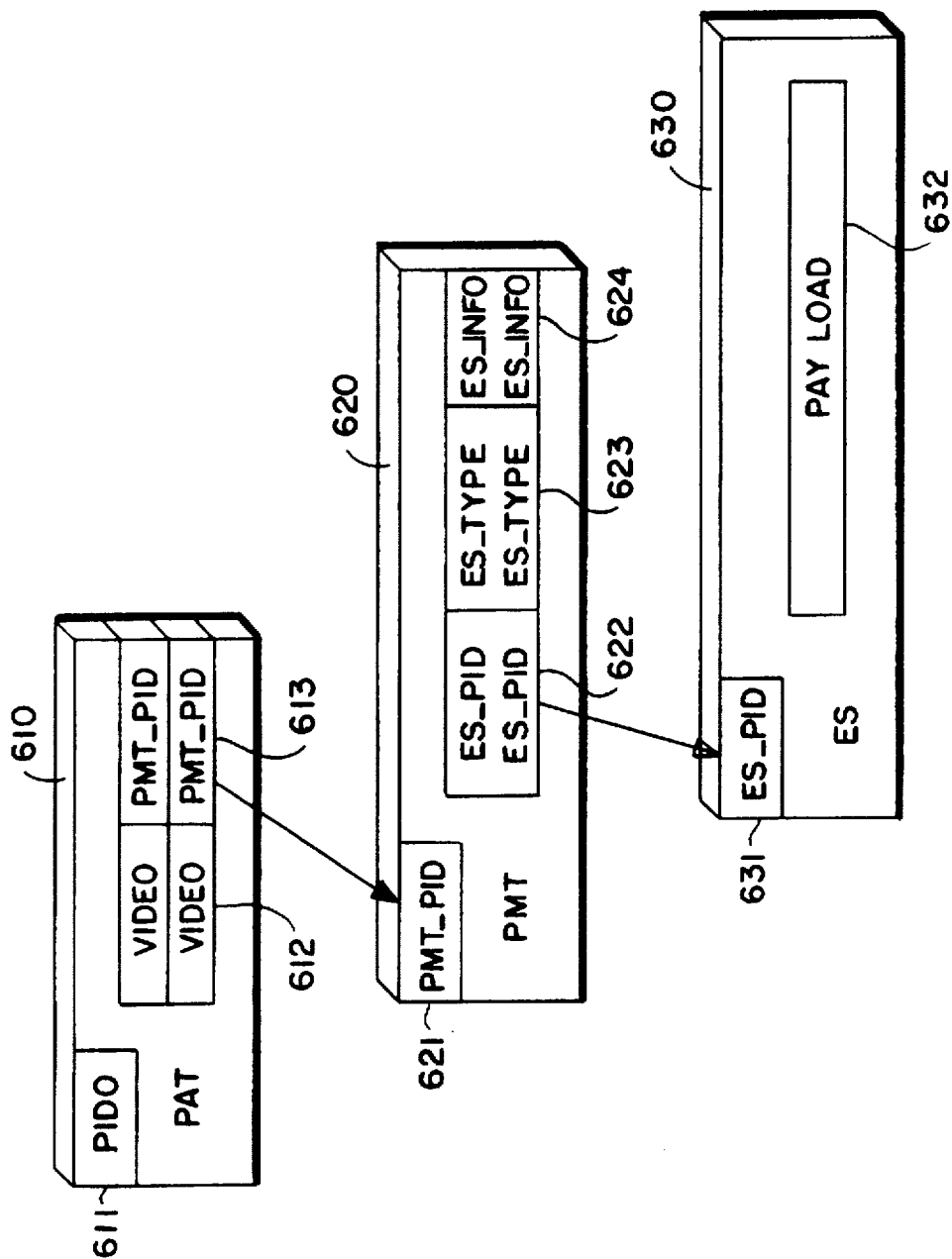

FIG. 6 shows how the structural relationship of elementary streams is maintained within the transport stream 200 of FIG. 2. The standard admits many different packet types, three are of concern to this description: video program association table (PAT) packets 610, video program map table (PMT) packets 620, and elementary stream (ES) packets 630. Each packet is identified with a packet identifier (PID), e.g., field 225 of FIG. 3. It should be apparent that the "video" transport stream can contain just audio or data portions without any video component.

Video Program Association Table Packet

Each video program is identified with a unique program number. The video program association table (PAT) provides the correspondence between the program number of a particular video, and packet identifiers (PID) of the elementary streams which composite the video program.

The PAT packet 610 is identified with a PID having a value of zero, e.g., PID0 611. The PAT packet 610 includes a list 612 of PNs, e.g., video_1 video_2, together with the values of the PIDs of the associated PMT packets 620, e.g., PMT_PID 613.

Video Program Map Table Packet

The PMT packet 620, identified with a PMT_PID 621, includes a list of PIDs 621 of the ES packets (ES_PID) 630 which contain content of the referenced video programs. The ES type (ES_TYPE) 622 and other ES information (ES_INFO) 623 are also indicated. The ES_TYPE 622 can indicate, for example, audio, video, or private elementary streams. The ES_INFO 623 can indicate the nature of the material contained in the ES packets, for example, movie, game advertisement, and in the case of the invention, software programs, and their associated data, e.g., bit-maps.

Elementary Stream Packet

The ES packet 630, identified by an ES_PID 631, carries payload 632. The payload 632 includes the digital signals expressing some element of the transport stream content, e.g., audio, video, private. The ES packet 630 encodes signals at a rate which is commensurate with the bandwidth of the video channel of the circuit 131. According to a preferred embodiment of the invention, the ES packet 630 is used to encapsulate software programs in its payload.

Figure 7:
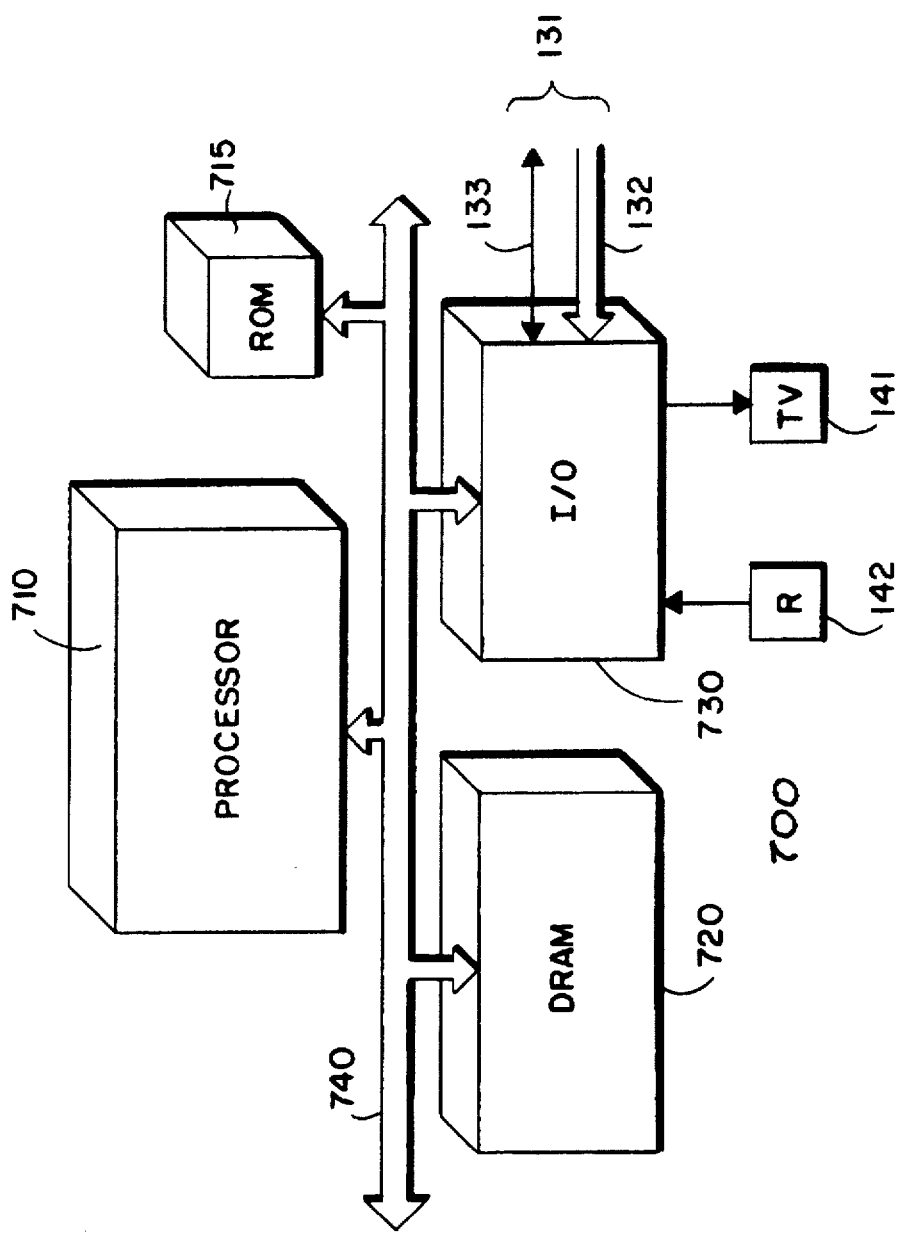
FIG. 7 is a block diagram of a set-top box client computer.

FIG. 7 shows a possible structure of the set-to box 700. The STB 700 includes a processor 710, read-only memory (ROM) 715, dynamic random access memory (DRAM) 720, and I/O interfaces 730 connected to each other by a bus 740. Notice, in order to make the STB 700 reliable and affordable, it does not include a mass storage device for storing software programs, bit-maps, and protocol stacks. An initial "boot" set of these, as described below, are stored in the ROM 715.

During operation of the STB 700, application software programs stored in the DRAM 720 are executed by the processor 710 under direction of an operating system. The application programs, in response to commands received from the remote controller 142, establish a connection with the circuit 131 of the network 130. While the circuit 131 is active, transport streams are received, including transport streams containing video programs for display on the TV 141. In the preferred embodiment of the invention, the transport streams can also carry software programs for execution by the processor 710.

Figure 8:
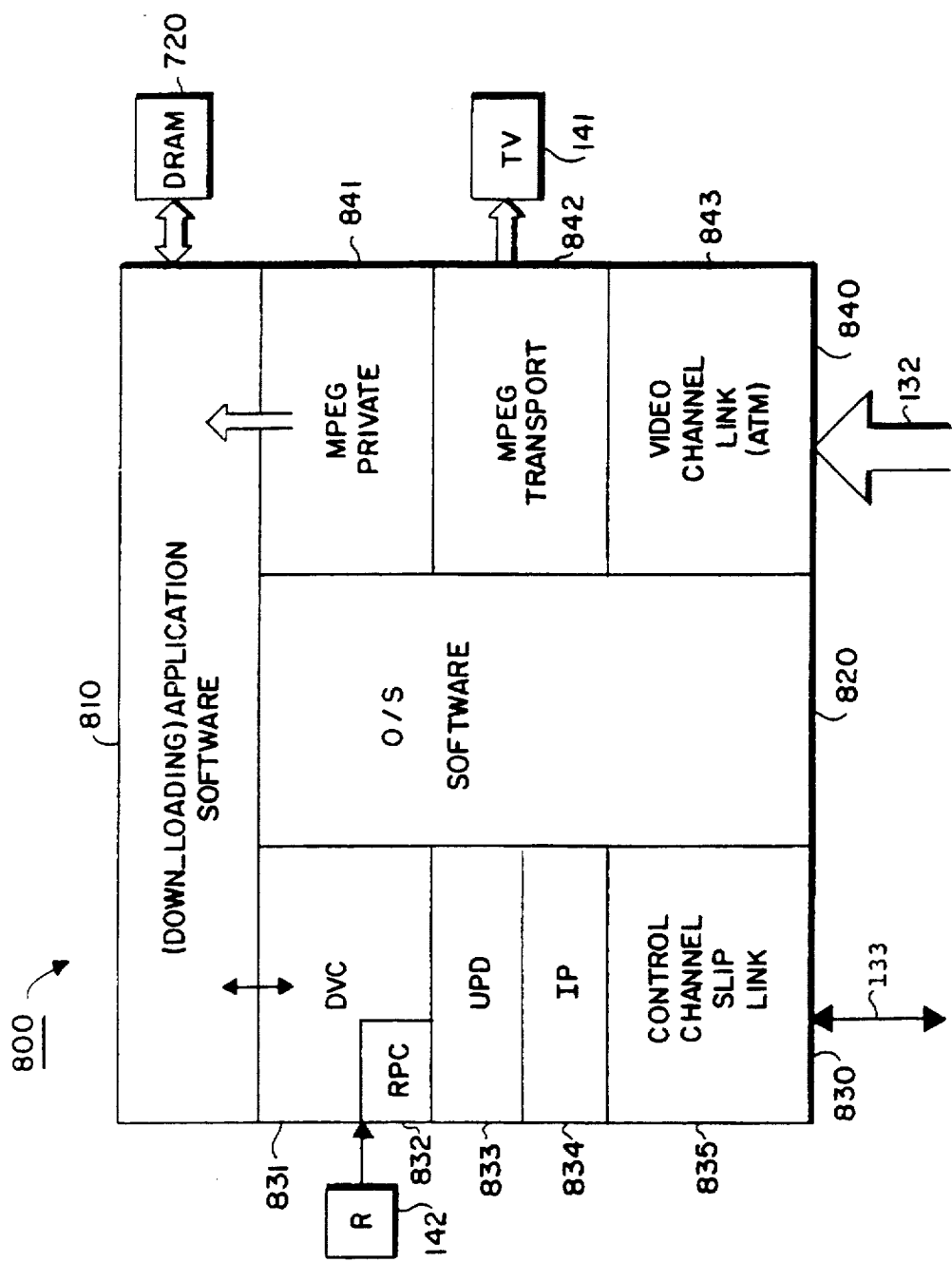
FIG. 8 is a block diagram of a processing environment of the computer of FIG. 7.

FIG. 8 shows a preferred processing environment 800 of the STB 700 of FIG. 7. The processing environment 800 includes software and protocol stacks. The software includes application software 810 and operating system (O/S) software 820. The protocol stacks include a control protocol stack 830 and a video protocol stack 840. The control stack 830 is connected to the control channel 133, and the video stack 840 is connected to the video channel 132.

In a preferred embodiment of the invention, initial downloading application software 810, O/S software 820, and protocol stacks 830 and 840 are stored in the ROM 715 for immediate execution as a "boot" program by the processor 710 of FIG. 7.

The control stack 830 includes a digital video client (DVC) layer 831, a remote procedure call (RPC) layer 832, a user datagram protocol (UDP) layer 833, an internet protocol (IP) layer 834, and control channel synchronous line IP (SLIP) link 835.

The video stack 840 includes an MPEG private data layer 841, an MPEG transport layer 842, and an asynchronous transmission mode (ATM) video channel link 843, in the case where the network uses ATM protocols. Note that the control stack 830 can operate bidirectionally sending and receiving data of the application software 810, whereas the video stack 840 can only receive data.

During operation of the STB 700, the processes 800 receive user commands from, for example, the remote controller 142. The commands are converted to remote procedure calls. The RPCs are further encapsulated by the UDP and IP layers of the control protocol stack 830 as request datagrams. The SLIP link 835 presents the datagrams to the control channel 132.

The gateways 125 receive the commands, and upon authentication, activate server processes. In response to the commands, the servers send transport streams on the video channel 132, and replies on the control channel 133. The software 810 and 820 determines if the commands were serviced, and accordingly processes the transport stream using the video channel 132.

Figure 9:
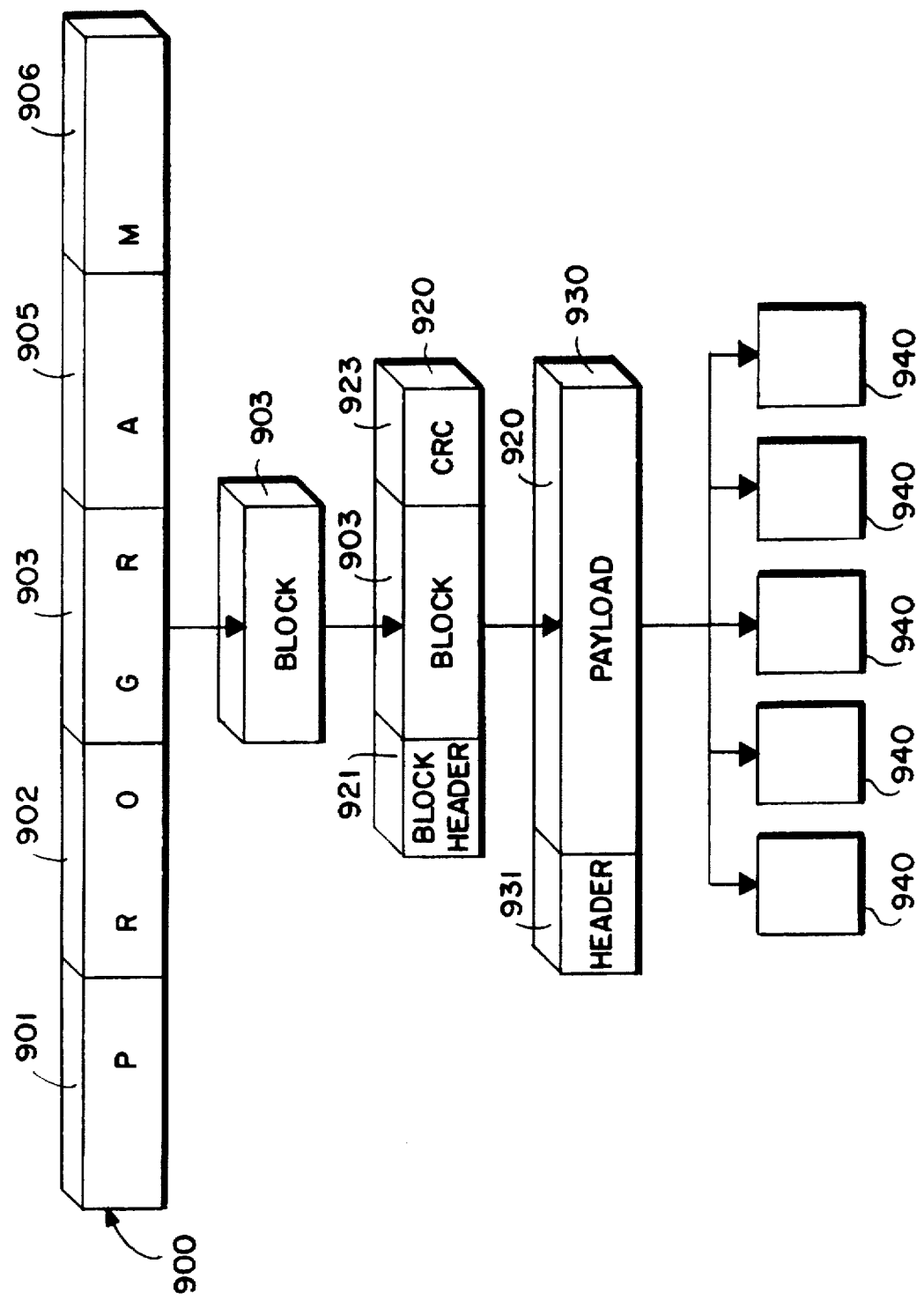
FIG. 9 is a block diagram of a program encapsulated in a video transport stream.

FIG. 9 shows a software program 900 which can be transported by the system 100 according to the principles of the invention. The software program 900 is partitioned into a plurality of blocks 901–906. The blocks 901–906 are sized to minimize network utilization and errors. Individual blocks are sequentially extracted from the program 900.

Each block is pre-pended with block header information 921, and post-pended with error checking information (CRC) 923 to create a formatted block 920. The formatted block 920 becomes the payload of a TS packet 930 having a packet header 931. Packets can further be encapsulated, depending on the network protocol. For example, the packet 930 can be transmitted as fifty-three byte ATM cells 940.

Two fine grained encapsulation schemes are proposed, an MPEG scheme and an OFF-SET scheme. The OFF-SET scheme is simpler to encode and decode, however, the MPEG scheme conforms to an industry standard.

The fields of the MPEG scheme are shown in FIG. 10 and Table A. According to the MPEG scheme, the block is encapsulated in accordance with a MPEG-2 private section format having a field 1012 of private data bytes, e.g., a portion of the program being transported. Here the "section_syntax_indicator" bit (1002) of the program association table is set to a logical "1." The section numbers can be used to properly sequence the blocks during reconstruction. The private data bytes are the actual program portions of the software being transported.

TABLE A

| Syntax [Field Name] | Size in bits | Ref. Numeral |
|---|---|---|
| private_section() { | | |
| table_id | 8 | 1001 |
| section_syntax_indicator [set to '1'] | 1 | 1002 |
| private_indicator | 1 | 1003 |
| reserved | 2 | 1004 |
| private_section_length | 12 | 1005 |
| if(section_syntax_indicator = '0' { | [note, here | |
| for ( i=0; i<N; i++) { | value is '1'] | |
| private_data_byte | 8 | [not used] |
| } | | |
| } | | |
| else { | | |
| table_id_extension | 16 | 1006 |
| reserved | 2 | 1007 |
| version_number | 5 | 1008 |
| current_next_indicator | 1 | 1009 |
| section_number | 8 | 1010 |

TABLE A-continued

| Syntax [Field Name] | Size in bits | Ref. Numeral |
|---|---|---|
| last_section_number | 8 | 1011 |
| for ( i=0; i<private_section_length-9; i++) { | | |
| private_data_byte | 8 | 1012 |
| } | | |
| CRC_32 | 32 | 1013 |
| } | | |
| } | | |

Figure 11:
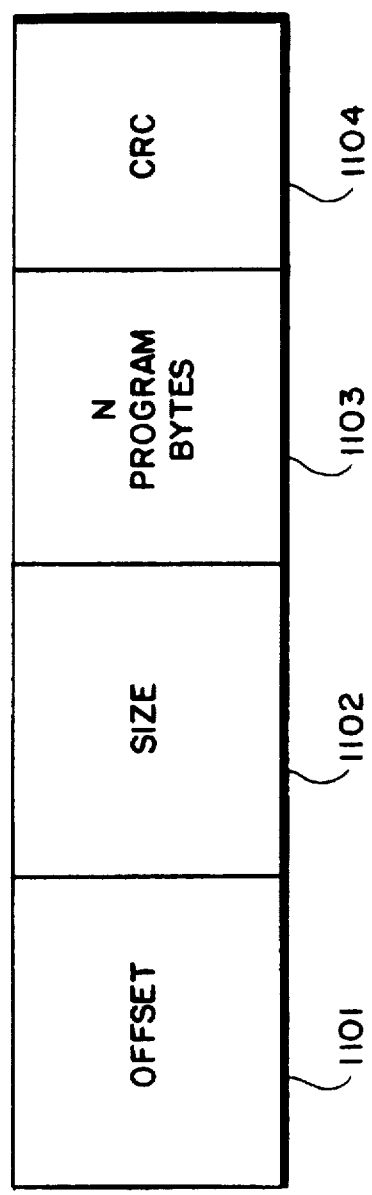
FIG. 11 is a block diagram of an OFF-SET based encapsulation.

In a second scheme, as shown in FIG. 11 and Table B, the blocks are transported using an OFF-SET based format. Here the off-set field indicates the relative position of the current block (private data bytes) with respect to the beginning of the software program being transported.

TABLE B

| Syntax [Field Name] | Size in bits | Ref. Numeral |
|---|---|---|
| off-set packet () { | | |
| off-set | 32 | 1101 |
| size | 16 | 1102 |
| for ( i=0; I<N; i++ ) | | |
| {private_data-byte} | 8 | 1103 |
| CRC | 32 | 1104 |
| } | | |

Figure 12:
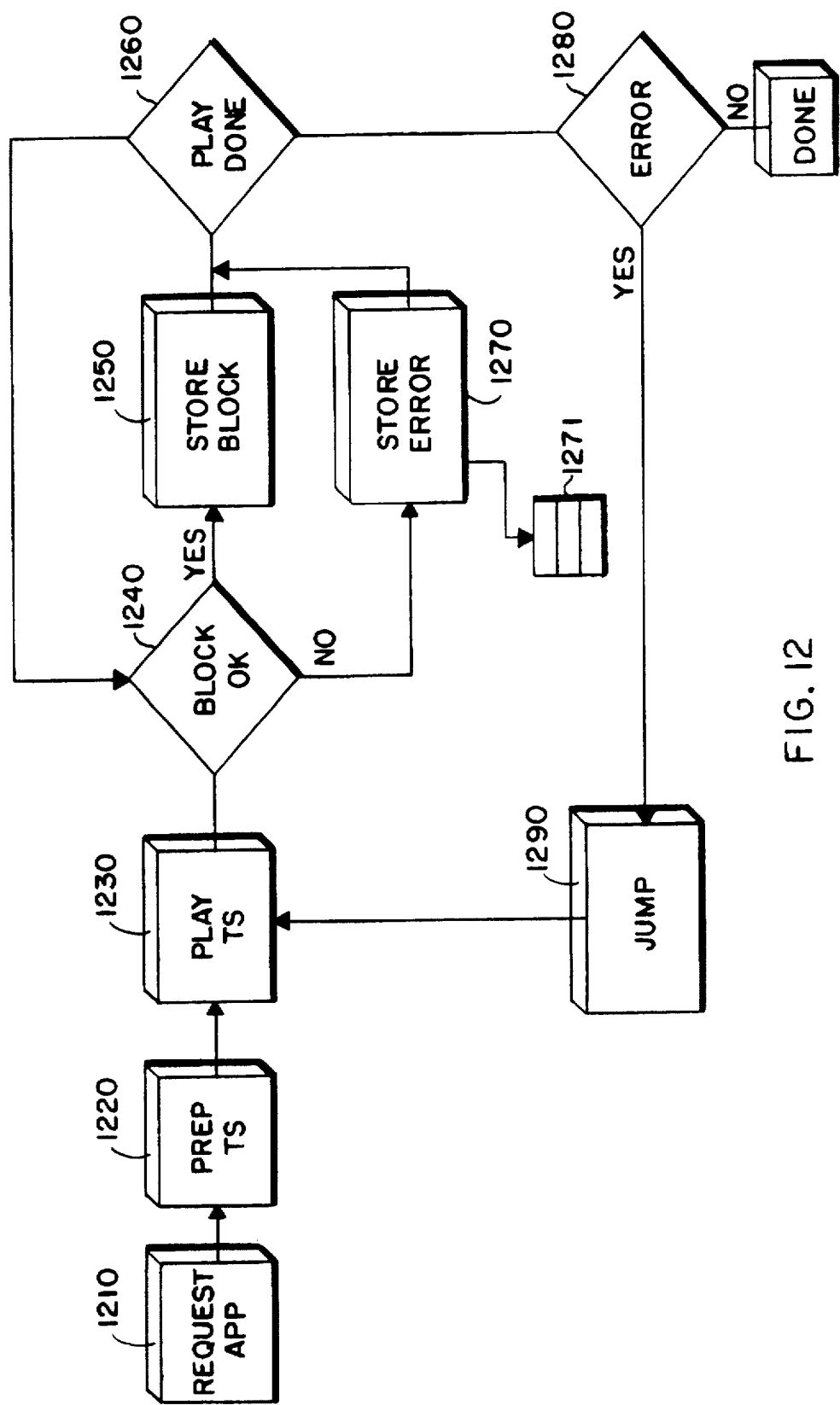
FIG. 12 is a flow diagram of a process for downloading a software program using a video channel.

Several transport processing and error recovery schemes are proposed for downloading software using VOD services. Download Software With Error Tracking FIG. 12 shows a process 1200 for downloading software according to a preferred embodiment of the invention. A downloading application 810 requests a specific software program (APP) in step 1210 using the control channel 133. The server 110 prepares a transport stream, however, instead of carrying a video program, the transport stream encapsulates the requested software program as described above in step 1220. In step 1230, the program is played, e.g., downloaded, as a continuous bit stream over the video channel 133. In most VOD systems, video channels can transport millions of bits per second. Therefore, as an advantage of the invention, even a large software program can be downloaded fairly quickly.

As each TS packet is received, a determination is made if the block was received correctly, step 1240. If the block was received correctly, then, in step 1250, store the block in the DRAM 720. Otherwise, in step 1270, store an error indication in a bad-block list 1271. The error indication can identify the erroneously received block. Continue receiving all of the blocks until the entire software program has been downloaded, step 1260. After the program has been received, determine if the bad-block list 1271 is empty, e.g., no errors, step 1280. If there were error indications stored, then issue a JUMP command to the position in the transport stream were the first bad-block was received, step 1290, and re-play the stream from that point forward.

During the replay, only store those blocks which were erroneously received. This process can be repeated until all blocks have been received correctly, e.g., the bad-block list 1271 is empty. If the bad-block list 1271 is of a limited size, the downloading of the program can be terminated with a STOP command at any point.

In an alternative embodiment, blocks incorrectly received, can be retransmitted using the control channel 133 while downloading of the program on the video channel 132 continues. This will work well as long as the rate of bad-blocks does not overwhelm the bandwidth capabilities of the control channel 132.

If the processor 720 has limited compute power, undecoded portions of the transport stream can be stored in the DRAM 720. When the DRAM 720 becomes full, a STOP command can be issued. The program can be decoded while the playing is stopped. When more memory becomes available, after completing the decoding, the downloading can be resumed to download the remaining portions of the program.

During the replaying of the program, it may be possible to speed-up the bad-block processing. If the bad-blocks are few and far apart, it may be quicker to use JUMP/PLAY/STOP commands to skip over blocks correctly received. It is possible to compute whether it is quicker to request a new starting point during replay using the control channel 133, or whether it is quicker to let the transport stream reach that point at continuous bit rate speeds over the video channel 132.

Download Software with Limited Error Tracking

Some STB configurations may not include enough DRAM to build a bad-block list, or to store the packets before decoding. Therefore, in another transport scheme, the server plays the program as above, until a block is erroneously received. At this point, play is stopped, and replay is initiated at the position of the incorrect block. This sequence, of STOP, JUMP, and PLAY commands can be repeated until the entire program has been correctly reconstructed in the STB 700 dealing with errors one at a time. Although this scheme uses a simpler process and less memory, it may take longer to receive a complete program.

Download Software Without Error Tracking

As stated above, the software can include bit-maps. The application dependant bit-maps are used to construct menus and other graphic displays. The data of a high-resolution full-color bit-map can be large. It is proposed that bit-maps are received as one continuous stream without any error tracking. The assumption is that a relatively small number of errors in the bit-maps will not impact the use of the system. The downloading process 1200 can compute the number of errors permitted in the bit-maps before replay of the bit-map is required.

Download Software Using Remote File Server

Some VOD systems include the RF server 120. An RF server is used as a distribution point for large data files, other than video programs. It is possible to download programs using the RF server 120. Here, the software is stored as files on the disk 111 of FIG. 1. In this case a different set of commands is used, namely, OPEN, READ, CHAIN_READ, CLOSE for example. The OPEN command identifies the file storing the program to be downloaded. A READ command requests a next block. A CHAIN_READ command includes a large number of individual READ requests. As an advantage, a CHAIN_READ command only consumes a single back-and-forth request/reply pair of messages on the control channel. Thus, it is also possible to read the entire program, or bit-map file using a single request, as above.

For each request, single or chained, the RF server 120 can encapsulate the software on-the-fly as described above for the video server 110. The difference being that the remote file service facilities are used instead of the video service facilities.

The principles of the invention have been described with respect to specific embodiments. It will be apparent to those skilled in the art that various modifications can be made to the embodiments shown. For example, the software can be encoded according to video standards other than MPEG. Other network transmission modes can be used. In addition, the encapsulation as described above can be performed off-line, prior to transport of program files. Therefore, the spirit and scope of the invention are set out in the appended claims.

We claim:

1. A method for downloading software programs from a server computer to a client computer using a communications network having circuits configured for transporting video signals of video programs, comprising:

encoding a software program into a video transport stream;

transmitting the video transport stream from the server computer to the client computer as a continuous video transport stream over a circuit of the network; and decoding the continuous video transport stream to reconstruct the software program in a memory of the client computer.

2. The method of claim 1 wherein the circuit of the network includes a bidirectional control channel and a unidirectional video channel, and further comprising the steps of:

sending a request for the software program from the client computer to the server computer using the bidirectional control channel; and receiving, in response to the request, the continuous video transport stream from the server computer in the memory of the client computer using the unidirectional video channel.

3. The method of claim 2 wherein the video transport stream includes a plurality of transport packets, each of the plurality of transport packets including a header and payload, and further comprising:

partitioning the software program into a plurality of blocks;

formatting each of the plurality of blocks as the payload of one of the plurality of transport packets.

4. The method of claim 3 further comprising:

formatting the payload as a private data section of an industry standard MPEG transport packet.

5. The method of claim 3 further comprising:

formatting the payload as an off-set packet, each off-set packet including an off-set field to indicate a relative position of a current block with respect to the beginning of the software program being transmitted.

6. The method of claim 3 further comprising:

while receiving the plurality of transport packets of the continuous video transport stream, determining if each of the plurality of transport packets was received correctly or incorrectly, and if one of the plurality of transport packets was received incorrectly, entering an identity of the incorrectly received transport packet in a bad-block list.

7. The method of claim 6 further comprising:

after receiving all of the plurality of transport packets comprising the software program, resending, if the bad-block list is not empty, any of the transport packets identified in the bad-block list, until the entire software program is correctly reconstructed in the memory of the client computer.

8. The method of claim 7 further comprising:

while resending the incorrectly received transport packets, determining if a next incorrectly received transport packet can be resent sooner by directly jumping to a position in the video transport stream of the next incorrectly received transport packet, as opposed to continuing the resending of the video transport stream, and if so, skipping over any correctly received transport packets.

9. The method of claim 3 further comprising:

while receiving the plurality of transport packets of the continuous video transport stream, determining, for each transport packet, if the transport packet was received correctly or incorrectly, and if the transport packet was received incorrectly, resending the incorrectly received transport packet using the bidirectional control channel, while continuing receiving the video transport stream on the unidirectional video channel.

10. The method of claim 3 further comprising:

while receiving the plurality of transport packets of the continuous video transport stream, determining if a particular transport packet was received correctly or incorrectly, and if the transport packet was received incorrectly, immediately resending the video transport stream from the point of the incorrectly received packet.

11. The method of claim 3 further comprising:

while receiving the plurality of transport packets of the continuous video transport stream, determining the number of transport packets that were received incorrectly; and resending any of the incorrectly received transport packets until the number of incorrectly received transport packets is less than a predetermined threshold.

12. The method of claim 3 further comprising:

encapsulating the plurality of transport packets into asynchronous mode transmission cells.

13. In a video-on-demand system, a disk-less set-top box for downloading software programs from a video server of the video-on-demand network, the set-top box comprising:

a read-only memory storing a boot program, a control protocol stack, and a video protocol stack, the control protocol stack being connected to a bidirectional channel of a circuit of the network, and the video protocol stack being connected to a unidirectional video channel of the circuit;

means for requesting a software program from the video server, the means for requesting connected to the control stack;

means for continuously receiving the software program as an encoded video transport stream, the means for receiving connected to the video protocol stack; and means for decoding the video stream to reconstruct the requested program in a volatile dynamic random access memory of the set-up box.

14. A set-top box for downloading software programs from a video server of a video-on-demand network, a set-top box comprising:

a read-only memory for storing a boot program, a control protocol stack, and a video protocol stack, the control protocol stack being connected to a bidirectional control channel of a circuit of the network, and the video protocol stack being connected to a unidirectional video channel of the circuit;

a selector, connected to the control stack, for requesting a software program from the video server over the control channel;

a receiver, connected to the video protocol stack, for continuously receiving the software program as an encoded video transport stream; and a decoder for decoding the video transport stream to reconstruct the requested program in a volatile dynamic random access memory of the set-up box.

15. The set-up box of claim 14, wherein:

the set-up box contain only a non-permanent storage unit storing software programs; and further comprising:

a processor executing the received program.

16. The set-up box of claim 14, wherein:

the video transport stream includes a plurality of transport packets, each of the plurality of transport packets including a header and a payload, and further comprising:

an encoder for partitioning the software program into a plurality of blocks and formatting each of the plurality of blocks as the payload of a respective one of the plurality of transport packets.

17. The set-up box of claim 16, wherein:

the decoder includes an error-correcting unit for correcting errors in the received video transport stream;

the error-correction unit determines if one of the plurality of transport packets was received incorrectly, and if so resends the one transport packet using the bidirectional control channel, while continuing to receive the video transport stream on the unidirectional video channel.

18. The set-up box of claim 16, wherein:

the payload is formatted as a private data section of an industry standard MPEG transport packet.

19. The set-up box of claim 16, wherein the decoder includes:

a error-correcting unit for determining if each of the plurality of transport packets was received incorrectly, and entering an identity of the incorrectly received transport packet in a bad-block list.

20. An video-on-demand system, comprising:

a communications link including a unidirectional video channel and a bidirectional control channel;

a server station for storing at least one of software programs and video;

a set-top box for downloading software programs from the server via the unidirectional video channel, including:

a read-only memory for storing a boot program, a control protocol stack, and a video protocol stack, the control protocol stack being connected to the bidirectional control channel, and the video protocol stack being connected to the unidirectional video channel;

a director connected to the control stack for requesting via the control channel a software program from the video server;

a receiver connected to the video protocol stack for continuously receiving the software program as an encoded video transport stream over the video channel; and a decoder for decoding the video stream to reconstruct the requested program in a volatile dynamic random access memory of the set-up box.

* * * * *